United States Patent
Welcker et al.

(10) Patent No.: US 7,634,724 B2
(45) Date of Patent: Dec. 15, 2009

(54) SYSTEMS AND METHODS FOR SUPPORTING CUSTOM GRAPHICAL REPRESENTATIONS IN REPORTING SOFTWARE

(75) Inventors: Brian Lee Welcker, Seattle, WA (US); Christopher Alan Hays, Monroe, WA (US); Jason D. Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 10/929,197

(22) Filed: Aug. 30, 2004

(65) Prior Publication Data

US 2006/0048048 A1    Mar. 2, 2006

(51) Int. Cl.
*G06F 17/00* (2006.01)

(52) U.S. Cl. .................. 715/243; 715/255; 715/234

(58) Field of Classification Search .................. 715/523, 715/513, 511, 500, 517, 503, 200, 234, 243, 715/255, 256
See application file for complete search history.

(56) References Cited

U.S. PATENT DOCUMENTS

| | | | |
|---|---|---|---|
| 5,493,490 A * | 2/1996 | Johnson | 705/26 |
| 5,706,505 A | 1/1998 | Fraley et al. | 707/103 R |
| 5,832,504 A * | 11/1998 | Tripathi et al. | 715/235 |
| 5,911,068 A | 6/1999 | Zimmerman et al. | 395/682 |
| 6,065,012 A | 5/2000 | Balsara et al. | 707/102 |
| 6,081,263 A | 6/2000 | LeGall et al. | 345/327 |
| 6,160,549 A | 12/2000 | Touma et al. | |
| 6,463,442 B1 | 10/2002 | Bent et al. | 707/103 R |
| 6,714,219 B2 | 3/2004 | Lindhorst et al. | 345/769 |
| 2002/0128958 A1* | 9/2002 | Slone | 705/37 |
| 2002/0169650 A1* | 11/2002 | Dougherty et al. | 705/8 |
| 2002/0169658 A1* | 11/2002 | Adler | 705/10 |
| 2002/0178172 A1* | 11/2002 | Moore et al. | 707/102 |
| 2003/0182303 A1* | 9/2003 | Gibson | 707/102 |
| 2003/0233249 A1* | 12/2003 | Walsh et al. | 705/1 |
| 2004/0003138 A1 | 1/2004 | Finocchio | 709/328 |
| 2004/0024763 A1* | 2/2004 | Anderson | 707/9 |
| 2004/0066410 A1 | 4/2004 | Lindhorst et al. | 345/769 |
| 2004/0073916 A1* | 4/2004 | Petrovic et al. | 725/18 |
| 2005/0004947 A1* | 1/2005 | Emlet et al. | 707/104.1 |
| 2005/0033764 A1* | 2/2005 | Reid | 707/102 |
| 2005/0114089 A1* | 5/2005 | Celestini | 702/186 |

OTHER PUBLICATIONS

"Dynamic Data Binding with XML," *EXE*, 2000, 15(2), 24-28.

(Continued)

*Primary Examiner*—Thu Huynh
(74) *Attorney, Agent, or Firm*—Woodcock Washburn LLP

(57) ABSTRACT

Systems and methods for supporting custom report layouts allow features that may be available to supported report layouts to also be made available to custom layouts. A custom layout definition may first meet a set of report definition criteria so that it is recognizable to report processing software. A design tool is provided that may be used to create such a custom layout definition. The custom layout may then be passed to report processing software. The report processing software can initially process the custom layout, and provide it with any features available in the initial processing stage. The reporting software may provide an interface for custom processing of the custom layout. The interface may be accessible to custom layout builder objects. Custom layout builder objects can be designed to use the report building components provided through the interface to build a custom report layout.

21 Claims, 10 Drawing Sheets

OTHER PUBLICATIONS

Franklin, K., "Supercharge Data Binding," *Visual Basic Programmer's J.*, 2000, 10(3), 32-33, 39-40, 42, 44 and 46.

Li, Q-S et al., "Study of the XML Data Binding Model at Object Level," *J. Xidian University*, 2001, 28(6), 768-771 (English language abstract included).

Metz, E. et al., "XML Data Binding," *Dr. Dobb's J.*, 2003, 28(3), pp. 26, 28, 30, 32, 35-36.

Ogawa, R. et al., "Template-Based, Format-Extensible Authoring for BS Digital Data Broadcast Service," *Proceedings 2001 Symposium on Applications and the Internet Workshops*, San Diego, California, Jan. 8-12, 2001, 207-212.

U.S. Appl. No. 10/400,375, filed Mar. 27, 2003, Hays et al.

U.S. Appl. No. 10/400,734, filed Mar. 27, 2003, Hays et al.

Anupam, V., et al., "Personalizing the web using site descriptions," *IEEE*, 1999, 732-738.

Tanzer, B.A., et al., "Connecting data access pages together," http://msdn.microsoft.com/library/en-us/dnacc2k/html/conceptdap.asp?frame=true, 8 pages.

Sakairi, T., "A site map for visualizing both a web site's structure and keywords," *IEEE*, 1999, IV-200-IV-205.

* cited by examiner

| Salesman (501) | 1990 Sales (502) | Total Sales (503) |
|---|---|---|
| | | |

*(Prior Art)*
*Fig. 5a*

| Salesman (501aa) | 1990 Sales (502aa) | Total Sales (503aa) |
|---|---|---|
| Bob (501a) | $9765 (502a) | $17,251 (503a) |
| Martha (501b) | $867 (502b) | $11,629 (503b) |
| Hank (501c) | $656 (502c) | $16,101 (503c) |

*(Prior Art)*
*Fig. 5b*

|  |  | *2001* (601) | *2002* (602) | *Total* (603) |
|---|---|---|---|---|
| *Retail* (604) | Acme (605) | $ 13,312 (606) | $ 11,156 (607) | $ 24,468 (608) |
| | Bob's Discount (609) | $ 6,421 (610) | $ 1,523 (611) | $ 7,944 (612) |
| *Wholesale* (613) | ABC, Inc. (614) | $ 11,156 (615) | $ 13,312 (616) | $ 24,468 (617) |
| | XYZ, Ltd. (618) | $ 1,523 (619) | $ 6,421 (620) | $ 7,944 (621) |
| *Grand Total* (622) | | $ 19,733 (623) | $ 12,679 (624) | $ 32,412 (625) |

SYSTEMS AND METHODS FOR SUPPORTING CUSTOM GRAPHICAL REPRESENTATIONS IN REPORTING SOFTWARE

CROSS-REFERENCE TO RELATED APPLICATIONS

This application is related to co-pending U.S. application Ser. No. 10/400,734, filed on Mar. 27, 2003, entitled "Defining a report based on data regions and including custom data in a report definition,"; and to co-pending U.S. application Ser. No. 10/875,832, filed on Jun. 23, 2004, entitled "Systems and methods for flexible report definitions including table, matrix, and hybrid designs."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

FIELD OF THE INVENTION

The present invention relates to generating reports, and more particularly to techniques for supporting custom report definitions in commercial reporting software.

BACKGROUND OF THE INVENTION

In any enterprise, data regarding aspects thereof is accumulated over time. This data can be used to report the status of the enterprise. For example, with regard to a sales enterprise, sales data can be accumulated pertaining to each sale of a product, including the salesman, the customer, the region of the salesman, the region of the customer, the amount of the sale, the quantity of the product sold, the date of the sale, the date of the delivery of the sold product, and so on. Based on such sales data, then, it may be that a report is generated that details sales by year, by month, by customer by year, by product by quarter, by salesman by delivery date, by region by week, etc.

The data that populates a report will typically be accumulated in a data source, such as a database. A data source, as the term is used here, is a storehouse for digitally recorded data. In order to filter the data in a data source into properly organized columns and rows for a report, a report designer may specify, in a report definition, the particular data that is desired from a data source. For example, a report designer might specify that he wants a "salesman name" in the first column of a report.

The report designer may then write a program that recognizes the field indicated for the first column of a report definition (salesman name), queries a data source for all salesman names, and places them, one after the other, in the first column of a report. Instead of writing his own program to carry out this task, the report designer may use commercial reporting software that provides this function. Such software may allow a report designer to simply specify, in a report definition, a type of data he wants in the various columns and/or rows of a report. The commercial software will then automatically analyze the report definition, query a database, and place the desired data in a report.

FIG. 5a and FIG. 5b provide a simple example of a report definition and a corresponding report. The exemplary report design in FIG. 5a provides a salesman column 501, a 1990 sales column 502, and a total sales column 503. This exemplary report design may be submitted to commercial reporting software that can pull the specified data from one or more data sources and format the data appropriately for a report such as that of FIG. 5b. FIG. 5b shows a populated salesman column 501aa, a populated 1990 sales data column 502aa, and a populated total sales column 503aa.

A more accurate view of a report definition is provided in FIG. 1b. A report definition, or report definition file 140 will typically specify a report layout 140a and a query 140b. The query 140b provides the data that is desired for a report, while the layout 140a gives the way in which the data will be presented in a report. In other words, the layout provides the graphical representation of a report on a display surface. Thus, the report definition in FIG. 5a can be understood as a graphical representation of a layout 140a and a query 140b of a report definition 140. The presentation of the three side-by side boxes could represent to hypothetical report generation software that three columns are to be generated. The contents of each box—501, 502, 503 could provide the query results that are to be placed in each column. A report definition may thus be represented graphically. It may also be represented by any other means of describing the layout and contents of a report. For example, a mark-up language such as the extensible markup language (XML) may be used to declare the various layout properties and data contents of a report. Thus a report definition file may be an XML file.

FIG. 1a provides a high-level view of exemplary report processing software 110 for populating a report definition 100 with appropriate data. The report processing software 110 may comprise a plurality of data extensions 111 for properly interpreting data stored in any of a plurality of data sources 120, 121. The report processing software 110 may also comprise a number of rendering extensions 112. The rendering extensions 112 convert generated reports into appropriate file formats, e.g. Hyper-Text Markup Language (HTML) 130, Extensible Markup Language (XML) 131, or some other file format 132. A process (not shown) capable of reading the formatted output files 130, 131, 132 can then display the report through a Graphic User Interface (GUI). In summary, a report definition 100 is used by the report processing software 110 to identify the data to be gathered from data sources 120, 121 and compile the data into a properly structured report. The software 110 may generate a report in any file format 130, 131, 132. This process is also described in U.S. patent application Ser. No. 10/400,734, which is hereby incorporated by reference in its entirety.

Those who design reports want flexibility in the ways they can organize and present a report. Thus, modern commercial reporting software typically supports a variety of report layouts. Two of the primary report layouts common today are the table and the matrix. A table layout is depicted in FIG. 5b, while an exemplary matrix layout is depicted in FIG. 6a. Note how the matrix is characterized by an empty corner cell, usually in the top left region of the report, while the table has no empty corner cell. Both layouts are characterized by columns arranged along a horizontal axis and rows arranged along a vertical axis.

While table and matrix report layouts are common, and thus commonly supported by commercial reporting software, a host of additional layouts are often desired. FIG. 6b provides just one example of a potentially unsupported report layout. The report layout of FIG. 6b dynamically changes from a horizontal layout 660 to a vertical layout 670 depending on how much data there is. When there are only four data entries, 650, 651, 652, and 653 for the report, the horizontal layout 660 is used, but when there are over four entries, e.g. 650, 651, 652, 653, 654, 655, and 656, a vertical layout 670 is desired. Using city names in and around Washington State, the exemplary report of FIG. 6b might appear as either of the following:

Small Amount of Data:

| Seattle | Spokane | Tacoma | Bellevue |
|---------|---------|--------|----------|

Large Amount of Data:

| |
|---|
| Seattle |
| Spokane |
| Tacoma |
| Bellevue |
| Vancouver |
| Walla Walla |
| Snohomish |
| Kennewick |
| Pasco |
| Moses Lake |

One could imagine a situation in which such a layout is desired. Similarly, one might imagine the report definition file for such a report. It would specify the various layout properties of the report, including the dynamic change property, and the data to place within the various layout properties. Unfortunately, modern report processing software may not, and likely will not, support the layout of FIG. 6b, and may similarly fail to support many other custom report layouts. While report processing software may support a wide range of layouts, there are near infinite possibilities for reporting layouts that may be desired. Commercial reporting software may attempt to support as many practical layouts as possible, but will inevitably fall short of customer needs in some settings.

The solution for those who wish to create a report with a custom layout has traditionally been to write custom software to generate the desired report. Needless to say, this can be somewhat more painstaking than using commercial reporting software. It is a barrier to creating custom report layouts that may frequently result in a report designer making do with one or more layouts that are supported by his or her commercial software. Thus, a designer may choose a layout that is "second best" for his or her desired report. Alternatively, if a report designer is determined to Write a program to support a desired layout, he or she will have to make do without the many additional features provided by commercial reporting software.

FIG. 3 provides a more detailed view of typical commercial reporting software 310. A plurality of supported report layouts 340 may be used with the software 310, while the many unsupported report layouts 350 are not available for use with the software. The software 310 includes a variety of features 360 that facilitate the creation of reports. Features 360 may include, for example, functions that facilitate insertion of desirable properties such as colors, drillthroughs, show/hide, and so on. There are a host of such features 360 available in modern commercial reporting software 310, and an exhaustive list is not helpful here. These features 360 are not available to those who write custom software to support a custom report definition.

Typical commercial reporting software 310 may also include the nuts and bolts processes 370 for building reports of the various supported layouts 340. These processes 370 may draw upon a set of report building components 380 that provide readily available report properties for insertion into reports. Because reports are typically destined to be rendered in a Graphic User Interface (GUI), the components 380 may be configured such that they recognizable to the rendering extensions 312. Exemplary building components 380 may be anything that is useful in generating a report, such as a process for generating a text box, process for generating an image, processes for drawing circles, creating columns, and so on.

In light of the current state of the art in commercial reporting software, there is a heretofore unrecognized need to provide support for custom report layouts in commercial reporting software.

SUMMARY OF THE INVENTION

In consideration of the above-identified shortcomings of the art, the present invention provides systems and methods for supporting custom graphical representations of reports, and/or regions of reports, in reporting software. Using the invention, any reporting software features that may be available for supported report layouts may also be made available to custom layouts. A custom layout definition may first meet a set of report definition criteria so that it is recognizable to report processing software. A design tool is provided that may be used to create such a custom layout definition. The custom layout may then be passed to reporting software. The reporting software can initially process the custom layout, and provide it with any features available in the initial processing stage. The reporting software may provide an interface for custom processing of the custom layout. The interface may be accessible to custom layout builder objects. Custom layout builder objects can be designed to generate a report layout using a plurality of processes for generating graphical features provided by the reporting software. Other advantages and features of the invention are described below.

BRIEF DESCRIPTION OF THE DRAWINGS

The systems and methods for supporting custom graphical representations in reporting software in accordance with the present invention are further described with reference to the accompanying drawings in which:

FIG. 5a graphically illustrates an exemplary report definition.

FIG. 5b illustrates an exemplary report layout that may be generated from the report definition depicted in FIG. 5a. The illustrated layout is known as a table.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

This detailed description generally explains and expands upon the concepts introduced in the summary of the invention, above. First, a general overview of the invention is provided with reference to FIG. 4 and FIG. 7. Next, aspects of the custom report definition criteria allowing custom layouts to be operable with reporting software are set forth. Next, the interface that may be provided by report processing software is described, along with the various supporting processes and features related to the operation of the interface. Finally, the design tool that may also be used as part of the invention is explained.

Note that while the following description generally treats the custom report layout as if it is assumed to be the entire layout of a report, this is for ease of description and is not required. A custom report layout could simply be one component of an overall report layout. In fact, several independent custom report layouts could be used within a report, mixed in with standard layout components. The custom report layout controls described herein need not do anything with the standard parts of a report layout. Each of the custom report layout controls need only acts upon the specific custom parts of an overall report layout for which it was designed.

Overview

Figure 4:
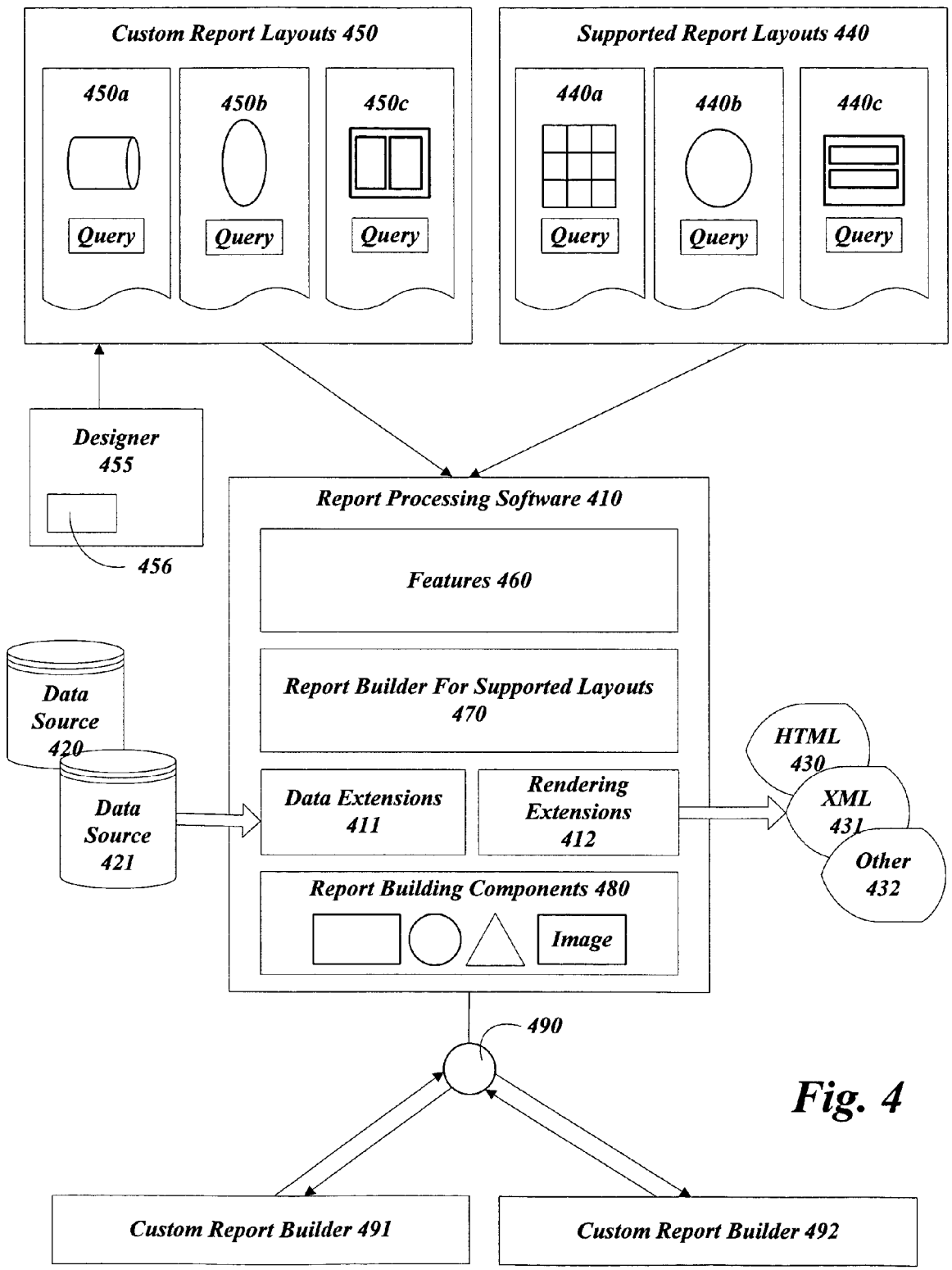
FIG. 4 illustrates various aspects of report processing software that is capable of supporting custom layouts. An interface 490 is provided that allows custom layout builders to construct custom layouts.
Figures 6A, 6B:
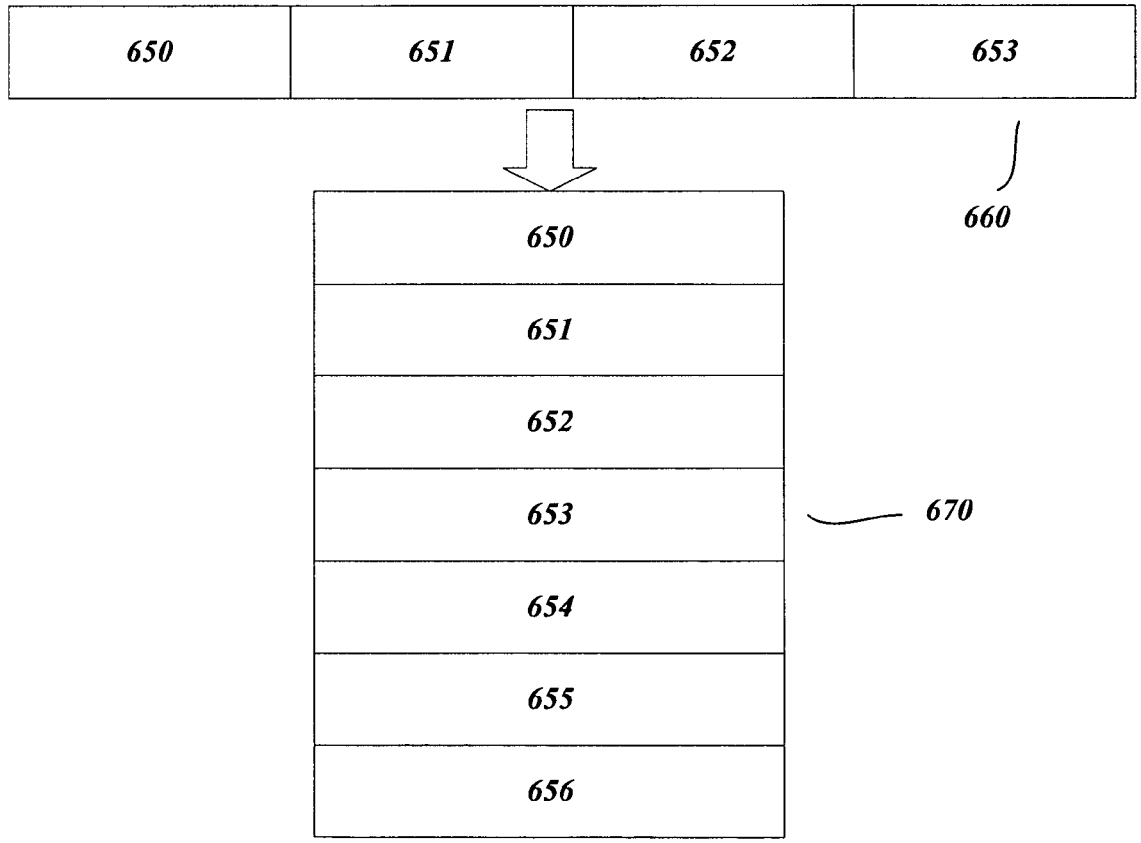
FIG. 6a illustrates an exemplary matrix report layout that typically but not necessarily is a layout supported by reporting software.
FIG. 6b illustrates a report layout that dynamically changes from a horizontal to a vertical presentation. Such a layout may be useful for reporting, but may not be supported by a given report processing software. This along with any other custom layout may be supported using the custom layout support techniques of the invention.

FIG. 4 provides a high-level view of many of the various aspects of the invention. In general, FIG. 4 depicts report processing software 410 that supports custom graphical representations 450 (also referred to as report layouts) in addition to a set of supported report layouts 440, i.e. supported graphical features. The configuration of FIG. 4 is an extensible platform for reporting, in that third parties not associated with the creator of the platform can extend and add value to the platform without modifying the platform itself, and without needing to know the behind-the-scenes design of the platform itself. Even core functions provided by the report processing platform of FIG. 4 can be upgraded and enhanced by third parties. Conversely, upgrades to the report processing platform of FIG. 4 may be made available for use with any third party extensions.

Custom report layouts 450 may be designed to meet a set of report definition criteria (not shown) so that they may be initially processed by the reporting software 410. Any of the features 460 provided by the reporting software 410 may be made available to the custom report. The reporting software 410 may also be equipped with an interface 490. The interface 490 may be published so that it is accessible to creators of custom report definitions 450. The interface 490 allows custom report builder processes 491, 492 to build reports specified in a custom layout, e.g. 450a, using the report building components 480 that are supported by the report building software 410. A designer 455 may help in the creation of custom report definitions 450 that meet the report definition criteria of the reporting software 410. In various embodiments, the designer 455 may be supplemented with a custom design control 456 so that the custom layout also meets any criteria for a custom report builder, e.g. 491.

Figure 7:
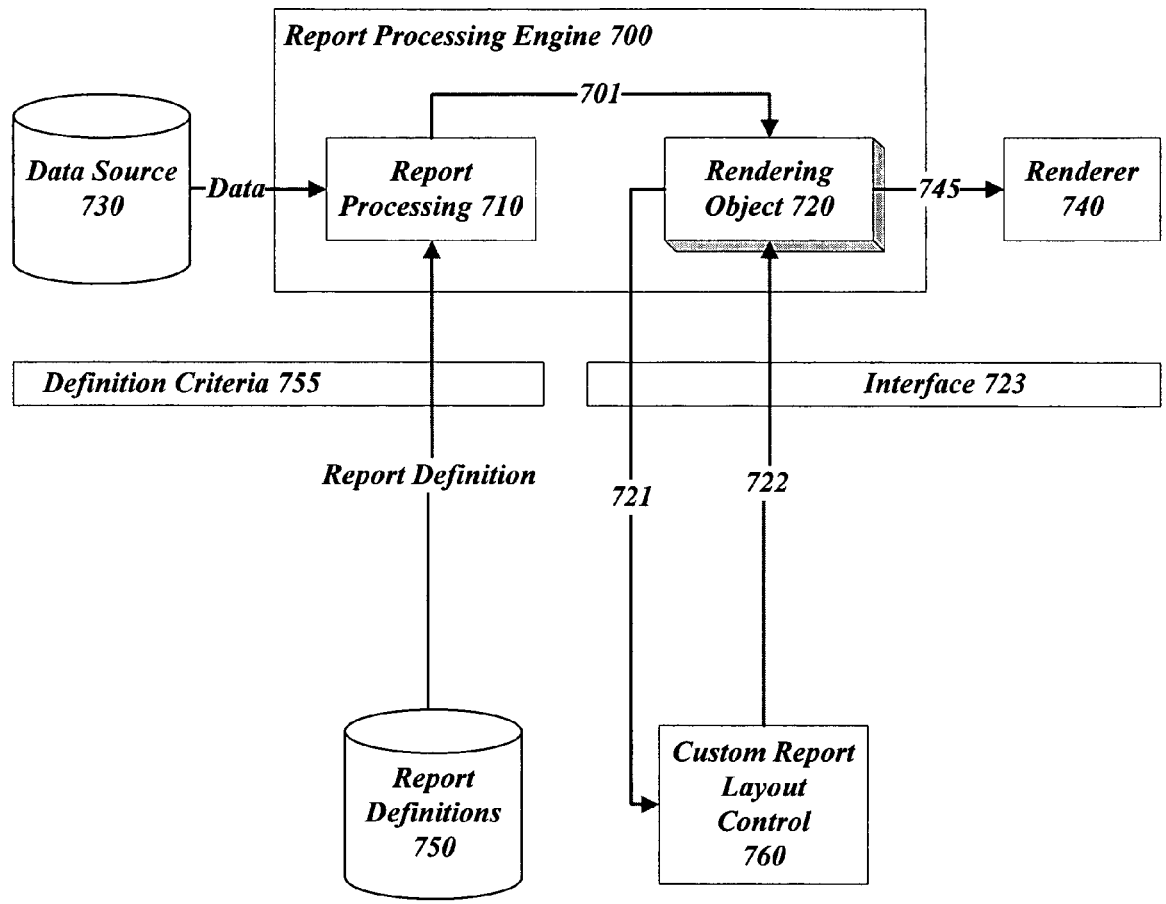
FIG. 7 illustrates various aspects of the invention including definition criteria that a custom layout may meet to be used with a given report processing engine, an exemplary custom report layout control, a rendering object, and an interface, as well as an exemplary interaction between these various components.

FIG. 7 provides another high-level view of various embodiments of the invention. FIG. 7 shows a preferred interaction between the various processing components introduced in FIG. 4. In FIG. 7, the report processing software 410 from FIG. 4 is referred to as a report processing engine 700. The features 460 and report builder for supported layouts 470 from FIG. 4 are generally referred to as report processing 710 in FIG. 7. The report building components 480 in FIG. 4 are referred to as the rendering object model 720 in FIG. 7.

FIG. 7 provides a Report Definitions Store 750 in which custom as well as standard report layout definitions may be placed. When a report is to be generated, a report definition from 750 can be processed by 710. As illustrated by the definition criteria box 755 through which report definitions must pass on their way to 710, the report definitions may be configured to meet a set of definition criteria prior processing by 710. As explained in the background, processing 710 generally comprises retrieving data for a report from a data store 730. To properly format the data in the layout specified by the report definition, the report definition and data may be delivered 701 to a rendering object model 720. In the case of supported report layout definitions, the data can be placed in an appropriate layout by a rendering object 720 without interaction between the rendering object 720 and any custom layout control 760. The custom layout control 760 generally corresponds to the custom report builders 491, 492 of FIG. 4.

In the case of custom report layout definitions, however, the rendering object 720 may communicate through interface 723 with one or more custom report layout controls 760. These controls may use the objects provided in 720 to properly generate a custom report in accordance with the wishes of the report creator. The report may be generated in any file format. For example, the report could be generated in XML, HTML, or as an image such as a TIFF of JPEG. In preferred embodiments, the report may be generated in an intermediate format, such as the intermediate report file format provided by MICROSOFT®, so that it may then be converted into any appropriate format as may be required by individual renderers 740. Thus, as a final step in the process urged by FIG. 7, a generated report can be passed to a renderer 740 for display.

Exemplary Report Definition Criteria

Report layout definition criteria 755 are any set of rules with which a report definition may comply. By complying with the criteria 755, a custom report definition may be processed by report processing 710. The criteria 755 may range from very simple to very complex. Providing simple criteria has the advantage of facilitating creation of custom report definitions, but may also allow for less flexibility in the types of custom report layouts that may be processed. More complex criteria, in general, may allow for more sophisticated custom layouts at the expense of being potentially more difficult for users to learn.

There are a wide variety of file formats which may be used to contain report definitions, and the criteria 755 may change depending upon the particular file format that is used by report processing 710. For example, a report definition may be stored as an XML file, as an HTML file, as a simple text (.txt) file, or as any other file for storing digital information. A set of standard tags for delineating aspects of report definition files referred to as the report definition language (RDL) is currently completing development at MICROSOFT® Corp. The RDL is considered a good candidate file type for use with the invention.

The exemplary criteria of the invention extend the design power reporting software. Where the prior art allows designers to specify properties of established and supported layouts, such as column widths in a table or matrix, the invention allows designers to specify entirely new layouts that are not natively supported in a given embodiment of reporting software. While most reporting software will support tables and matrices, consider reporting software that does not support the table or matrix report layout definition. In this case, a table and a matrix could be provided as custom layouts to extend the power of the reporting software. Below are two examples of custom layouts that use the definition criteria set forth in this section. The first example presents a table as a custom report layout definition that meets sufficient definition criteria to be used with the hypothetical report processing software. The second example presents a matrix as a custom report layout definition that meets sufficient definition criteria to be used with the hypothetical report processing software.

Exemplary custom layout 1: a table.

```
Category              Product
=Fields!Category.Value
                      =Fields!Product.Value
<CustomReportLayout Name="table1">
    <Type>MyTable</Type>
    <Top>0in</Top>
    <Left>0in</Left>
    <Height>0.75in</Height>
    <Width>4in</Width>
    <CustomData>
        <DataSetName>DataSet1</DataSetName>
        <DataRowGroupings>
            <DataGroupings>
                <DataGrouping>
                    <Grouping Name="table1_Category">
                        <GroupExpressions>
                            <GroupExpression>=Fields!Category.Value
                            </GroupExpression>
                        </GroupExpressions>
                    </Grouping>
                    <DataGroupings>
                        <DataGrouping>
                            <Static>true</Static>
                            <CustomProperties>
                                <CustomProperty>
                                    <Name>tbl:Height</Name
                                    >
                                    <Value>0.25in</Value>
                                </CustomProperty>
                            </CustomProperties>
                        </DataGrouping>
                        <DataGrouping>
                            <CustomProperties>
                                <CustomProperty>
                                    <Name>tbl:Height</Name
                                    >
                                    <Value>0.25in</Value>
                                </CustomProperty>
                            </CustomProperties>
                        </DataGrouping>
                    </DataGroupings>
                </DataGrouping>
            </DataGroupings>
        </DataRowGroupings>
```

| Exemplary custom layout 1: a table. |
|---|

```
<DataColumnGroupings>
    <DataGroupings>
        <DataGrouping>
            <Static>true</Static>
            <CustomProperties>
                <CustomProperty>
                    <Name>tbl:Width</Name>
                    <Value>2in</Value>
                </CustomProperty>
                <CustomProperty>
                    <Name>tbl:Header</Name>
                    <Value>Category</Value>
                </CustomProperty>
            </CustomProperties>
        </DataGgouping>
        <DataGrouping>
            <Static>true</Static>
            <CustomProperties>
                <CustomProperty>
                    <Name>tbl:Width</Name>
                    <Value>2in</Value>
                </CustomProperty>
                <CustomProperty>
                    <Name>tbl:Header</Name>
                    <Value>Product</Value>
                </CustomProperty>
            </CustomProperties>
        </DataGgouping>
    </DataGroupings>
</DataColumnGroupings>
<DataRows>
    <DataRow>
        <DataCell><DataValue><Value>=Fields!Category.Value</Value></DataValue></DataCell>
        <DataCell><DataValue><Value/></DataValue></DataCell>
    </DataRow>
    <DataRow>
        <DataCell><DataValue><Value/></DataValue></DataCell>
        <DataCell><DataValue><Value>=Fields!Product.Value</Value></DataValue></DataCell>
    </DataRow>
</DataRows>
    </CustomData>
</CustomReportLayout>
```

| Exemplary custom layout 2: a matrix. |
|---|

```
                        =Fields!Year.Value
                        =Fields!Month.Value       YTD Growth
=Fields!Category.Value  =Sum(Fields!Sales.Value)  =First(Fields!Growth.Value)
<CustomReportLayout Name="matrix1">
    <Type>MyMatrix</Type>
    <Top>0in</Top>
    <Left>0in</Left>
    <Height>0.75in</Height>
    <Width>6in</Width>
    <CustomData>
        <DataSetName>DataSet1</DataSetName>
        <DataRowGroupings>
            <DataGroupings>
                <DataGrouping>
                    <Grouping Name="matrix1_Category">
                        <GroupExpressions>
                            <GroupExpression>=Fields!Category.Value
                            </GroupExpression>
                        </GroupExpressions>
                    </Grouping>
                    <CustomProperties>
                        <CustomProperty>
                            <Name>tbl:Width</Name>
                            <Value>2in</Value>
                        </CustomProperty>
```

-continued

Exemplary custom layout 2: a matrix.

```
                <CustomProperty>
                    <Name>tbl:Height</Name>
                    <Value>0.25in</Value>
                </CustomProperty>
                <CustomProperty>
                    <Name>tbl:Header</Name>
                    <Value>=Fields!Category.Value</Value>
                </CustomProperty>
            </CustomProperties></DataGrouping></DataGroupings></DataRowGroupings>
<DataColumnGroupings>
    <DataGroupings>
        <DataGrouping>
            <Grouping Name="matrix1_Year">
                <GroupExpressions>
                    <GroupExpression>=Fields!Year.Value</GroupExpression>
                </GroupExpressions>
            </Grouping>
            <CustomProperties>
                <CustomProperty>
                    <Name>tbl:Height</Name>
                    <Value>0.25in</Value>
                </CustomProperty>
                <CustomProperty>
                    <Name>tbl:Header</Name>
                    <Value>=Fields!Year.Value</Value>
                </CustomProperty>
            </CustomProperties>
            <DataGroupings>
                <DataGrouping>
                    <Grouping Name="matrix1_Month">
                        <GroupExpressions>
                            <GroupExpression>=Fields!Month.Value</GroupExpression>
                        </GroupExpressions>
                    </Grouping>
                    <CustomProperties>
                        <CustomProperty>
                            <Name>tbl:Width</Name>
                            <Value>2in</Value>
                        </CustomProperty>
                        <CustomProperty>
                            <Name>tbl:Height</Name>
                            <Value>0.25in</Value>
                        </CustomProperty>
                        <CustomProperty>
                            <Name>tbl:Header</Name>
                            <Value>=Fields!Month.Value</Value>
                        </CustomProperty></CustomProperties>
                </DataGrouping>
                <DataGrouping>
                    <Static>true</Static>
                    <CustomProperties>
                        <CustomProperty>
                            <Name>tbl:Width</Name>
                            <Value>2in</Value>
                        </CustomProperty>
                        <CustomProperty>
                            <Name>tbl:Height</Name>
                            <Value>0.25in</Value>
                        </CustomProperty>
                        <CustomProperty>
                            <Name>tbl:Header</Name>
                            <Value>YTD Growth</Value>
                        </CustomProperty></CustomProperties>
                </DataGrouping>
            </DataGroupings></DataGrouping></DataGroupings></DataColumnGroupings>
    <DataRows>
```

-continued

Exemplary custom layout 2: a matrix.

```
        <DataRow>
            <DataCell><DataValue><Value>=Sum(Fields!Sales.Value)</Value
        ></DataValue></DataCell>
            <DataCell><DataValue><Value>=First(Fields!Growth.Value)</Value
        ></DataValue></DataCell>
        </DataRow>
    </DataRows>
  </CustomData>
</CustomReportLayout>
```

Exemplary Interface and Supporting Processes

While interfaces in the context of object-oriented computer programming are well known in the art, the invention makes novel use of interfaces to allow unprecedented custom control over report layouts. This section first sets forth the basic principles of object oriented computing and interfaces. The various potential features of interfaces for use with the invention are then described.

Figure 8:
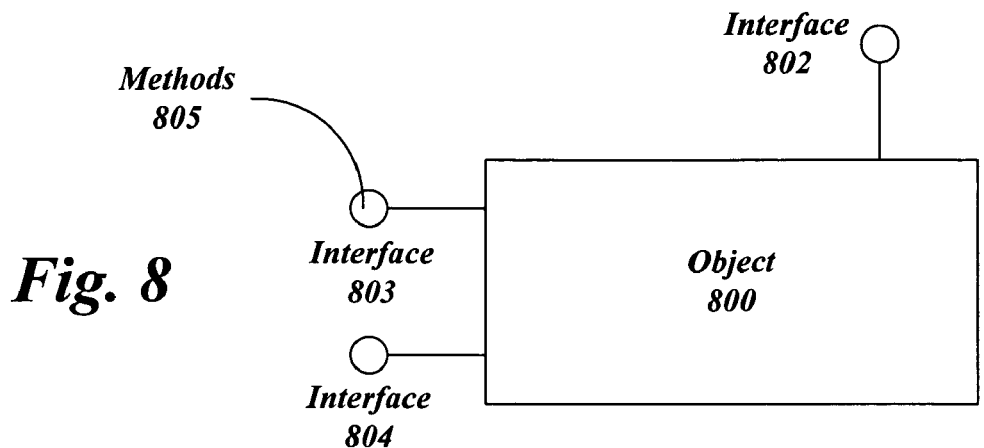
FIG. 8 illustrates an exemplary object with interfaces as is commonly used in object-oriented software design and as may be used in connection with aspects of the invention.

Elements 700, 710, 720, 760, etc. from FIG. 7 and any other aspects of the invention that can be implemented in software can be discrete units of software typically generated using object-oriented programming techniques. One such exemplary object is illustrated in FIG. 8, which diagrams the features of a typical COM object 800. Other object types are available and widely used in the industry, and the object 800 described here is intended as a nonlimiting example for the purpose of illustration. Objects such as 800 generally support one or more interfaces 802, 803, 804, each of which may include methods 805. A method 805 is typically a function or a procedure that performs a specific action and can be called by software, e.g. another object. Such software is referred to as the client of that object 800. The methods 805 that make up an interface 803 are usually related to each other in some way. In general, clients can access the services provided by an object 800 by invoking the methods 805 in the object's interfaces 802, 803, 804. Clients are generally prohibited from accessing an object's data. It should be noted that functions described herein and in the claims as accomplished by an object may also be achieved through multiple objects designed to interface with each other.

Typically, an object 800 is an instance of a specific class. One class, for example, might contain objects that provide services for opening a connection to a database server, while another class might contain objects for writing data to a file. Typically, a programmer knows an object's class prior to running an instance of that object. The class of an object is looked up in a class library. Such a library has access to a directory of all available classes of objects. A client can call a function in a library specifying the class of object it wants and the first supported interface to which it wants a pointer. The library then causes a server that implements an object of that class to start running. The library also passes back to the initiating client a pointer to the requested interface on the newly instantiated object. The client can then ask the object directly for pointers to any other interfaces the object supports.

Interfaces supported by objects are generally thought of as a contract between the object and its clients. The object promises to support the interface's methods as the interface defines them, and the clients promise to invoke the methods correctly. Thus, an object and the clients must agree on a way to explicitly identify each interface, a common way to describe, or define, the methods in an interface, and a concrete definition of how to implement an interface.

Thus, objects can be described in terms of the interface parameters that they inherit, as well as the class parameters that they inherit. Where a class of objects has a function for writing data to a file, for example, an instance that inherits the class will also be able to write data to a file, as well as any additional features and functions provided in the instance. Where a class supports a particular interface, an instance of the class inherits the "contract" and therefore also supports the interface. The objects through which aspects of the invention are implemented generally conform to these programming principles and understandings of the definitions for objects, classes, and interfaces. However, it should be clear that modifications and improvements to object-oriented programming techniques are constantly occurring, and the invention is not limited to objects of a particular type or with any specific features. The interface provided can be implemented in connection with objects of any kind now in use or later developed.

Referring to FIG. 7, the particular interface 723 used in connection with the invention may have any of a wide variety of features. Interface 723 generally allows the custom report layout control 760 client to access the features of a report processing engine 700 server object. Various embodiments may provide more specific access to a rendering object 720 provided within the report processing engine 700. There are numerous advantageous features that an interface 723 may provide, and a host of such features are provided below. The invention is not limited to the use of any particular interface features set forth here, or to the contemplated implementation of the interface features set forth here. Instead, the interface features are provided to catalog the many useful potential aspects of an interface for use with the invention. Finally, various aspects of the invention that facilitate the use of the interface 723 are also set forth below.

First, the interface 723 can be designed to be accessed by one or more custom report layout controls 760. To facilitate such access, the interface 723 may be a published interface, in that the various properties that allow custom report layout controls 760 to access the interface 723 can be provided for the use of the general public. An interface may be made public in any number of ways, including publication on the internet or with the literature distributed with software sales.

Interface 723 may be configured to acquire registration information from custom controls 760. The report processing engine 700 may be configured to maintain a registration of custom report layout controls 760 that are used with the engine 700. For example, the assembly and class for processing controls 760 may be obtained for a registration. A registration file may be, for example, a config file. A custom control 760 entry in a registration file can be matched to a name of a custom report layout stored in report definitions

750. In this way, the engine 700 can determine which custom control 760 to use with a particular custom layout. The following is an exemplary entry in a registration file:

```
<ReportLayouts>
    <ReportLayout Name="RichTextControl"
    Assembly="Montana.ReportingServices.ReportLayoutExtensions"
    Class="Montana.ReportingServices.
    ReportLayoutExtensions.RichTextControl"/>
</ReportLayouts>
```

Figure 10:
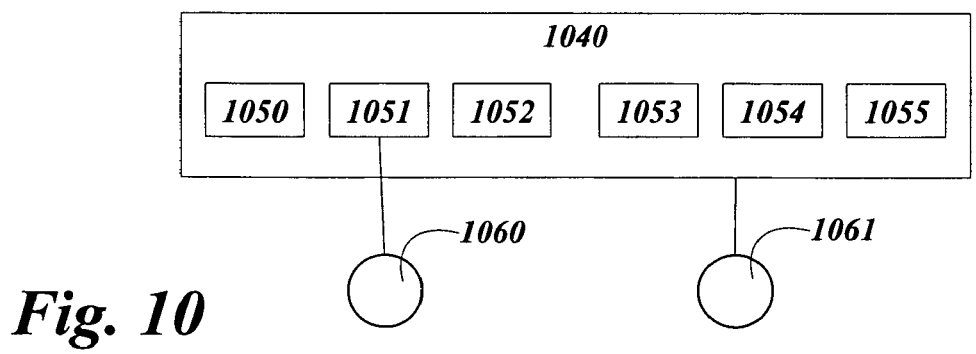
FIG. 10 illustrates exemplary objects and interfaces as may be used to implement the processes described in connection with the various interfaces of the invention.

A processing control interface 723 in accordance with the systems and methods set forth herein can comprise a plurality of interfaces and a plurality of objects may support those interfaces. FIG. 10 displays a generic view of interoperable objects 1050-1055 and interfaces 1060, 1061 as may be used in connection with the invention. Report processing engine 1040 may comprise any number of such interoperable objects 1050-1055. Also, the a plurality of objects 1050-1055 may provide supporting processing for an interface 1060. Supporting processes are described below that may be carried out by one or more distinct, individual objects, or that may be carried out as subprocesses of a larger object. Therefore, when a process is described as an object below, the flexible potential configurations of objects should be emphasized.

In general, an interface 723 may be configured to recognize a plurality of properties, or information which can be passed to the interface 723. The following is a list of exemplary properties that may be used with a processing control interface 723:

Custom layout property—This property can comprise the type of information specified for the custom report layout discussed in the definition criteria section above (see exemplary layout criteria 3). Thus, a custom layout property can give the details of a custom report layout for the rendering object 720 to convert into standard (renderable) report layouts.

Render layout property—This property can identify a standard, renderable report layout property which the rendering object 720 can use to construct a custom layout. This property may be initially null.

Interface 723 may comprise a plurality of methods, which can be used to request services from the interface 723. The following is a list of exemplary methods that may be used with a processing control interface 723:

Process method—A process method can generate a standard report layout from a custom report layout. It can store the created standard report layout in a location earmarked for delivery to a renderer 740.

On click method—An on click method can provide an event handler for user actions (see Events section below).

On double click—An on double-click method can provide another event handler for user actions (see Events section below).

On value change—An on value change method can provide another event handler for user actions (see Events section below)

On move—an on move method can provide another event handler for user actions (see Events section below).

The above interface properties and methods can be supported by processes in a rendering object 720. These processes may be extended to recognize the various criteria that are used in custom report layouts and to provide adequate support for the custom controls 760 that may access the rendering object 720. To keep with the exemplary embodiments described herein, the following gives a list of rendering object 720 extensions that may be implemented to properly provide support for custom layouts.

Exemplary Rendering Object Extension 1: Custom Report Layout

A custom report layout object can be a subclass of any standard report layout objects. The custom report layout object may comprise processes for representing a custom report layout. In various embodiments, these processes may recognize properties (given arbitrary names here) that can be described as follows:

| Property | Type | Description |
| --- | --- | --- |
| Type | String | The type of custom report layout. |
| CustomData | CustomData | Data for the custom report layout |
| RedirectTarget | String | URL to redirect the user to. |
| AltReportLayout | ReportLayout | Report layout to render instead of the custom report layout, if the custom layout type is not supported by the renderer. |

Exemplary Rendering Object Extension 2: Custom Data

A custom data object can represent any data to display in a custom report layout. The associated processes may recognize the following exemplary properties:

| Property | Type | Description |
| --- | --- | --- |
| DataColumnGroupings | DataGroupingCollection | The set of column groupings for the data |
| DataRowGroupings | DataGroupingCollection | The set of row groupings for the data |
| DataCells | DataCellCollection | The data values contained in each detail "cell" of the data |

Exemplary Rendering Object Extension 3: Data Grouping Collection

A data grouping collection object can provide an ordered list of data groupings for a custom layout. The associated processes may recognize the following exemplary properties:

| Property | Type | Description |
| --- | --- | --- |
| Layout index location | DataMemberCollection | Gets the data grouping at the specified index |

Exemplary Rendering Object Extension 4: Data Member Collection

A data member collection object can provide an ordered list of data members. The associated processes may recognize the following exemplary properties:

| Property | Type | Description |
| --- | --- | --- |
| Layout index location | DataMember | Gets the data member at the specified index |

Exemplary Rendering Object Extension 5: Data Member

A data member object can represent group instances within the custom report layout's data. There can be one data member for each group instance. For example, if sales data groups on product category and product along columns and country and region along rows, there may be one data member for each product category (that contains a data member for each product in that category) in the data column groupings and there may be one data member for each country (that contains a data member for each region in that country) in the data row groupings. The associated processes may recognize the following exemplary properties:

| Property | Type | Description |
| --- | --- | --- |
| Parent | DataMember | Parent data member |
| Children | DataGroupingCollection | Groups in contained row or column |
| IsTotal | Boolean | Indicates whether this instance of the group contains subtotal data values |

Exemplary Rendering Object Extension 6: Data Cell Collection

A data cell collection object can represent all the data cells in custom data. The associated processes may recognize the following exemplary properties:

| Property | Type | Description |
| --- | --- | --- |
| Layout index location | DataCell | Two dimensional array of data cells in row then column order. There may be as many rows as there are leaf-node DataMembers in the DataRowGroupings tree. There may be as many columns as there are leaf-node DataMembers in the DataColumnGroupings tree. A leaf-node DataMember is one with no Children. |
| Count | Int32 | The number of data cells |

Exemplary Rendering Object Extension 7: Data Cell

A data cell object can represent a single cell value in custom data. The associated processes may recognize the following exemplary properties:

| Property | Type | Description |
| --- | --- | --- |
| DataValues | DataValueCollection | The values contained in this cell. |

Exemplary Rendering Object Extension 8: Data Value Collection

A data value collection object can provide a list of data values in one cell of the custom data. The associated processes may recognize the following exemplary properties:

| Property | Type | Description |
| --- | --- | --- |
| Layout index location | DataValue | Gets the data value at the specified index |

Exemplary Rendering Object Extension 9: Data Value

A data value object can represent a single value within a data cell. The associated processes may recognize the following exemplary properties:

| Property | Type | Description |
| --- | --- | --- |
| Name | String | Identifier for the data value |
| Value | Variant | The data value |

Exemplary Rendering Object Extension 10: Report

A report object can provide any additional property for a report. The associated processes may recognize the following exemplary properties:

| Property | Type | Description |
| --- | --- | --- |
| CustomProperties | CustomPropertyCollection | Custom properties for the report |

Exemplary Rendering Object Extension 11: Report Layout

A report layout object can provide any additional property for a supported report layout. The associated processes may recognize the following exemplary properties:

| Property | Type | Description |
| --- | --- | --- |
| CustomProperties | CustomPropertyCollection | Custom properties for the report layout |

Exemplary Rendering Object Extension 12: Group

A group object can provide any additional property for group. The associated processes may recognize the following exemplary properties:

| Property | Type | Description |
| --- | --- | --- |
| CustomProperties | CustomPropertyCollection | Custom properties for the group |

Exemplary Rendering Object Extension 13: Custom Property Collection

A custom property collection object can provide a list of custom properties for a report, report layout or group. The associated processes may recognize the following exemplary properties:

| Property | Type | Description |
| --- | --- | --- |
| Layout[Int32 index] | CustomProperty | Gets the custom property at the specified index |

Exemplary Rendering Object Extension 14: Custom Property

A custom property object can provide a custom property for a report, report layout or group. The associated processes may recognize the following exemplary properties:

| Property | Type | Description |
| --- | --- | --- |
| Name | String | Name of the property |
| Value | Variant | Value of the property |

Exemplary Rendering Object Extension 15: Change Type Enumeration

A change type enumeration object can define a type of change to a custom report layout or an event handler for a custom report layout. The associated processes may recognize the following exemplary properties:

| Value | Description |
| --- | --- |
| None | Neither the render layout nor the underlying data source changed. |
| Render | The tender layout changed, requiring the report to be rendered again. |
| Process | Properties of a custom report layout changed, requiring the report to be processed again. |
| Data | Data in the underlying data source changed, requiring the queries in the report to be reexecuted. |
| Redirect | The user event may result in redirecting to another URL |

Exemplary Rendering Object Extension 16: Image Map Layout

An image map layout object can provide a region in an image map. The associated processes may recognize the following exemplary properties:

| Property | Type | Description |
| --- | --- | --- |
| ID | String | ID of the image map layout |
| Points | ImageMapPointCollection | The points that define the region for the image map layout |

Exemplary Rendering Object Extension 17: Image Map Point Collection

An image map layout object can provide a list of image map layout points. The associated processes may recognize the following exemplary properties:

| Property | Type | Description |
| --- | --- | --- |
| Layout index location | System.Drawing.PointF | Gets the point at the specified index |

Exemplary Rendering Object Extension 18: Dropdown Value Collection

A dropdown value collection object can provide a list of possible values for a dropdown. Dropdowns have both names and values (of type object) in the collection. The names may be shown to the user, while the values can be used as a resulting value for the on value change event described below.

Exemplary Rendering Object Extension 19: Value Collection

A value collection object can provide a list of data values for a report layout. The associated processes may recognize the following exemplary properties:

| Property | Type | Description |
| --- | --- | --- |
| Layout index location | Object | Gets the value at the specified index |

Set forth above are potential properties, methods, and supporting process extensions for an interface 723. Another set of features that may be associated with the interface are events that may be provided by the interface 723. In general, events provide a communication to an object that something has occurred. The thing that has occurred could be anything. However, a useful set of events has been determined for use in connection with the systems and methods of the invention. The invention is not limited to the use of any particular events set forth here, or to the contemplated implementation of the events. Instead, the below events are provided to comply with statutory requirement for the full disclosure of the invention.

Events can be passed to a custom report layout control 760 via event methods on the interface 723. The following events, given arbitrary names, may be passed:

OnClick—Events that may be used for button clicks, image maps, etc. The OnClick event may be called when the user clicks on a report layout that is marked to receive click events. In response to such an event custom report layout controls 760 can modify or create a new render layout (if needed) to be rendered based on the click. Exemplary arguments that may be provided with this event are as follows:

| Argument | I/O | Type | Description |
| --- | --- | --- | --- |
| ReportLayout | In | ReportLayout | A report layout that was clicked. If the renderer supports the custom report layout natively, this will be the custom report layout itself. |
| XPosition | In | Integer | X coordinate (%) of the click within the report layout |
| YPosition | In | Integer | Y coordinate (%) of the click within the report layout |
| ImageMapID | In | String | ID of the image map region that was clicked on, if any. Empty string if no image map was provided or the click was outside of a defined region. |
| Button | In | MouseButton | Indicates which mouse button was clicked |
| Return | Out | ChangeType | Indicates whether the render layout or underlying data was changed |

OnDoubleClick—Events that may be used for button clicks, image maps, etc. The on double click event may be called when a user double clicks on a report layout that is marked to receive click events. Custom report layout controls 760 may be configured to modify or create a new render layout (if needed) to be rendered based on the double click. Exemplary arguments that may be provided with this event are as follows:

| Argument | I/O | Type | Description |
| --- | --- | --- | --- |
| ReportLayout | In | ReportLayout | Report layout that was clicked. If the renderer supports the custom report layout natively, this will be the custom report layout itself. |
| XPosition | In | Integer | X coordinate (%) of the click within the report layout |
| YPosition | In | Integer | Y coordinate (%) of the click within the report layout |
| ImageMapID | In | String | ID of the image map region that was clicked on, if any. Empty string if no image map was provided or the click was outside of a defined region. |
| Button | In | MouseButton | Indicates which mouse button was clicked |
| Return | Out | ChangeType | Indicates whether the render layout or underlying data was changed |

OnValueChange—Events that may be used for writeback, dropdown selection, etc. The on value change event is called when the user modifies the value of a report layout (e.g. via editing a textbox or selecting values in a dropdown). The custom report layout control should modify or create a new render layout (if needed) to be rendered based on the value change. Exemplary arguments that may be provided with this event are as follows:

| Argument | I/O | Type | Description |
| --- | --- | --- | --- |
| ReportLayout | In | ReportLayout | ReportLayout with the changed value. |
| NewValues | In | ValueCollection | The new value(s) for the report layout |
| Return | Out | ChangeType | Indicates whether the RenderLayout or underlying data was changed |

OnMove—Events that may be used for table column rearrangement, matrix repivot, etc. The on move event may be called when a user drags a draggable report layout into another report layout that is a valid drop target. The custom report layout controls 760 maybe configured to modify or create a new render layout (if needed) to be rendered based on the drag/drop. Exemplary arguments that may be provided with this event are as follows:

| Argument | I/O | Type | Description |
| --- | --- | --- | --- |
| ReportLayout | In | ReportLayout | Report layout that was moved. |
| Target | In | ReportLayout | The report layout onto which the dragged report layout was dropped |
| XPosition | In | Integer | X coordinate (%) within the Target where the report layout was dropped |

-continued

| Argument | I/O | Type | Description |
| --- | --- | --- | --- |
| YPosition | In | Integer | Y coordinate (%) within the Target where the report layout was dropped |

-continued

| Argument | I/O | Type | Description |
| --- | --- | --- | --- |
| Return | Out | ChangeType | Indicates whether the render layout or underlying data was changed |

Report layout properties in the rendering object 720 maybe used to control which report layouts respond to which events. For example, the following exemplary report layout properties may be used:

| Property | Type | Description |
| --- | --- | --- |
| CanClick | Boolean | Indicates the report layout responds to click events |
| ImageMap | ImageMapLayoutCollection | An optional image map that provides regions for click events. Applies only to Image report layouts. |
| CanEdit | Boolean | Indicates the report layout responds to edit events. Applies only to Textbox |
| CanDrag | Boolean | Indicates the report layout can be dragged |
| DropTarget | Boolean | Indicates the report layout is a valid drop target for dragged layouts |

The following exemplary mouse button enumeration can be used in conjunction with the events to indicate which mouse button was clicked. In this example, simultaneous clicks can result in the earliest matching layout in the enumeration:

| Value | Description |
| --- | --- |
| Left | The left mouse button was clicked |
| Center | The center mouse button was clicked |
| Right | The right mouse button was clicked |

Exemplary Design Tool

Using the invention, any reporting software features that may be available for supported report layouts may also be made available to custom layouts. As described above, a custom layout definition may first meet a set of report definition criteria so that it is recognizable to report processing software. A design tool is provided that may be used to create such a custom layout definition. Such a design tool is any tool that provides assistance in creating custom report definitions that meet the definition criteria for report processing software. Various advantageous features of a design tool are set forth herein. The invention is not limited to these features.

FIG. 4 depicts a design tool 455 in relation to the various other aspects of the invention. The box inside the design tool 455 represents a custom report layout design control 456. This custom design control may be implemented alongside a custom report builder 492. The custom control 456 can assist in designing a custom layout definition that meets any additional criteria imposed by a custom report builder 492. Thus, a first set of criteria may be natively supported in a design tool 455, allowing for assisted design of custom layouts that meet the requirements of report processing software 410. A second set of criteria may be additionally supported by custom design controls 456, allowing for assisted design of custom layouts that meet the requirements of a custom report builder 492.

A registration file may be kept by the designer 455 to maintain useful information regarding the custom design controls 456. This registration information can be used to obtain assembly and class information for a custom design control 456. The following is an exemplary entry in a registration file:

```
<ReportLayoutDesigner>
    <ReportLayout Name="RichTextControl"
        Assembly="Microsoft.ReportingServices.
        ReportLayoutDesignerExtensions"
        Class="Microsoft.ReportingServices.
        ReportLayoutDesignerExtensions.RichTextControl"/>
</ReportLayoutDesigner>
```

Figure 9:
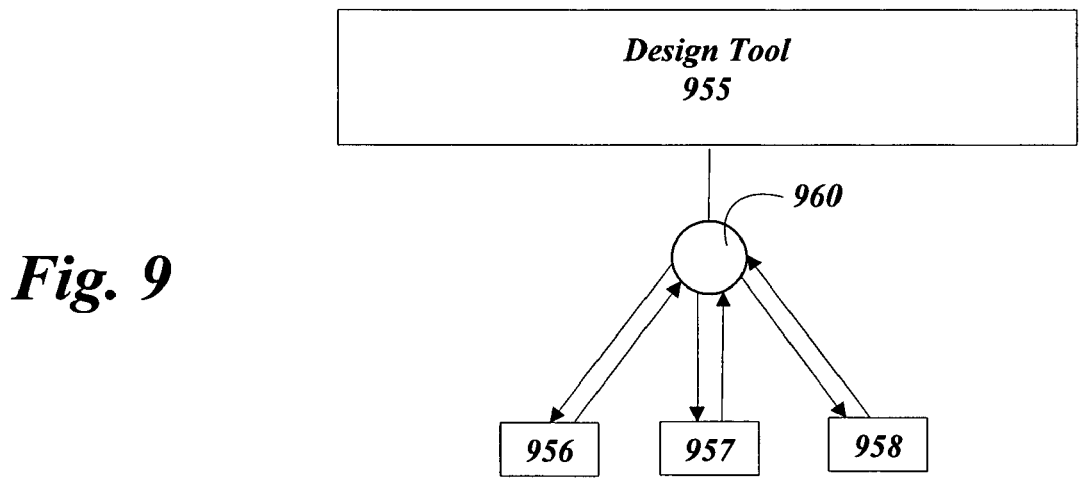
FIG. 9 illustrates a design tool with an interface that can be accessed by custom report layout design controls.

In implementations where a design tool 455 is configured to allow custom design controls 956, 957, 958, an interface may be provided to allow the custom design controls 956, 957, 958 to access the functions of the design tool 455. Such embodiments of the design tool are depicted in FIG. 9. The following are exemplary features of such an interface 960: The interface may require custom report layout design controls 956, 957, 958 to provide a toolbox icon. The interface may require custom report layout design controls 956, 957, 958 to support serialize/deserialize methods. The interface may provide custom report layout design controls 956, 957, 958 with a device context in which to write layout information. This may include the ability for the control 956, 957, 958 to request a larger drawing/event area when active to support such things as chart drop areas and table row/column selection bars. The interface may require the design tool 455 to pass all UI events to the custom report layout design controls 956, 957, 958. This can include drag/drop events for nesting standard (and custom) controls within a custom control. The interface may allow custom report layout design controls 956, 957, 958 to register to accept events from designer toolbars (e.g. formatting). The interface may allow custom report layout design controls 956, 957, 958 to register context menu layouts. The interface may allow custom report layout design controls 956, 957, 958 to register properties (e.g. name, type, description, list of valid values) to allow editing of those properties in the a property browser when the control is selected.

Exemplary Computing and Network Environment

Figure 2A:
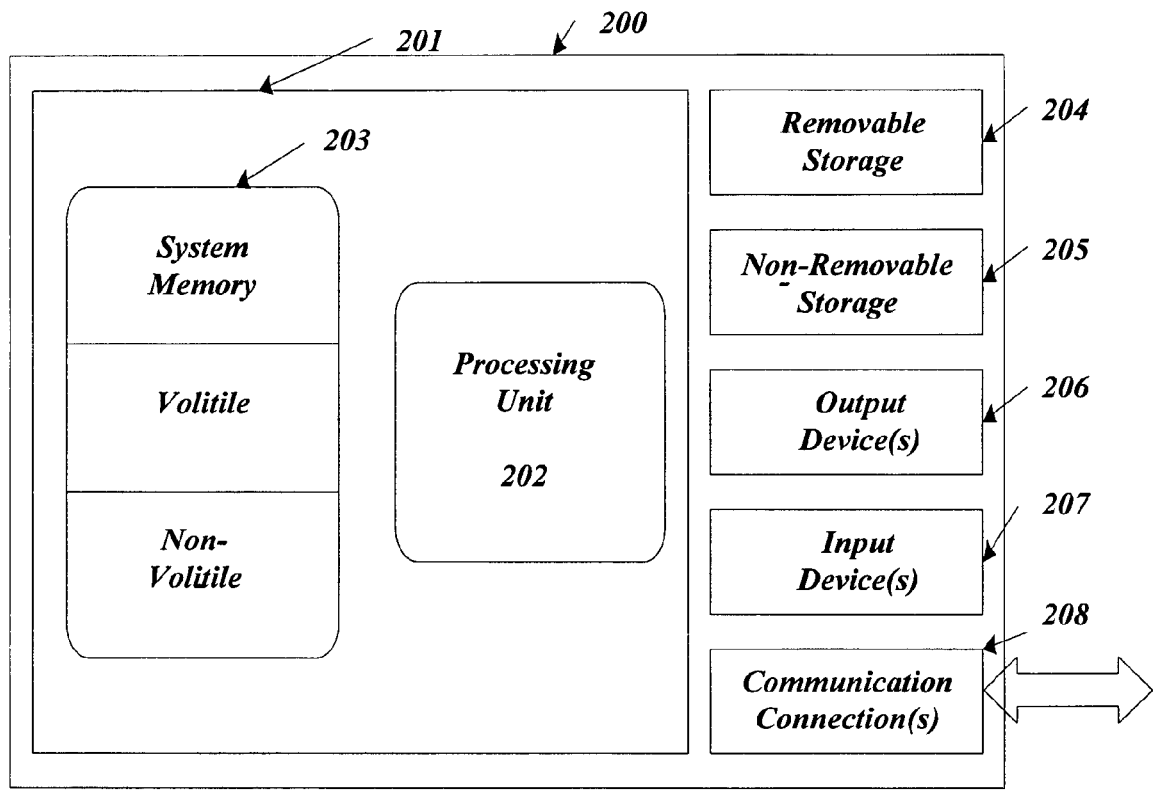
FIG. 2a is a block diagram broadly representing the basic features of an exemplary computing device suitable for use in conjunction with various aspects of the invention.

With reference to FIG. 2a, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

Figure 2B:
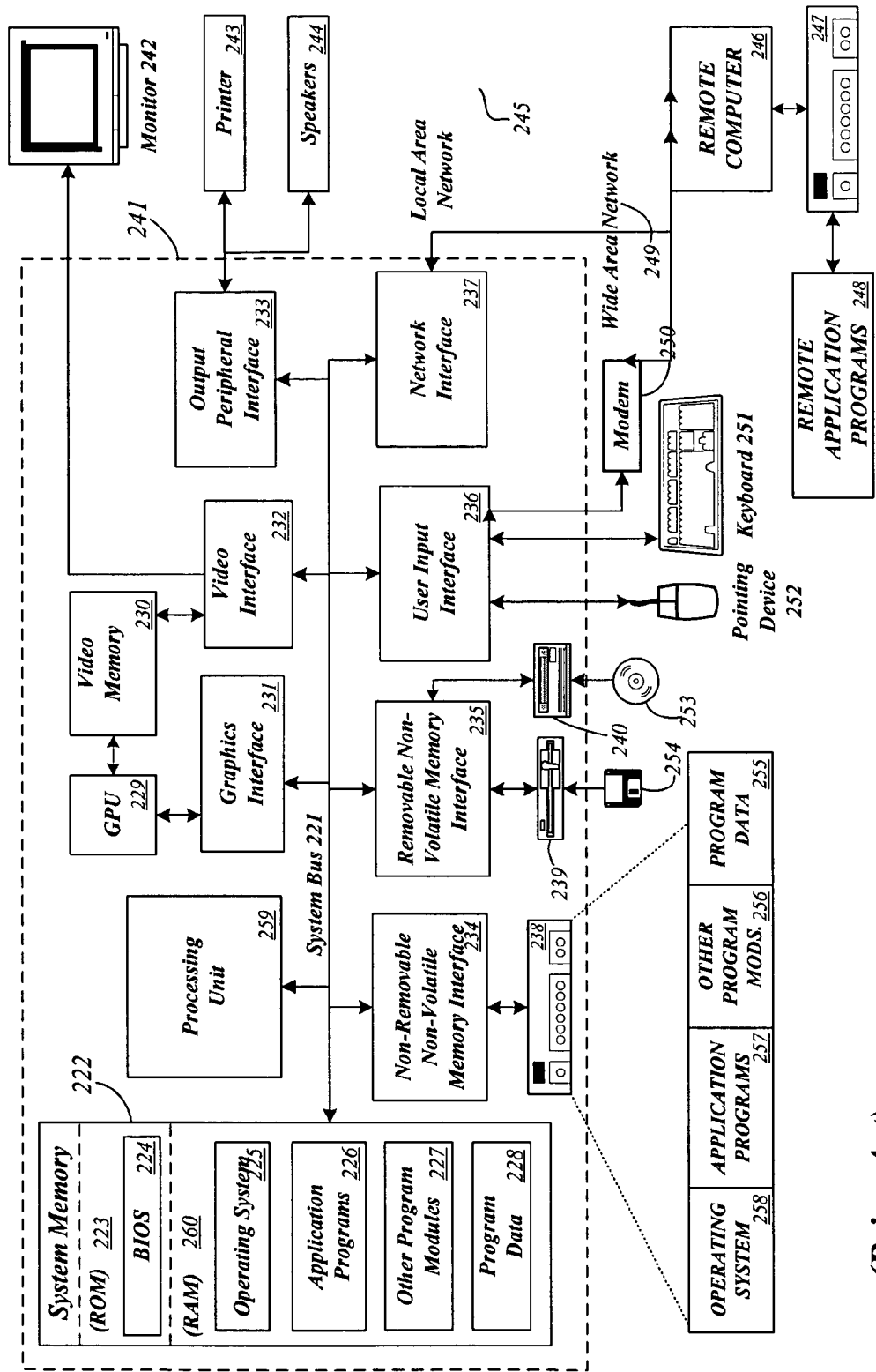
FIG. 2b is a block diagram representing a more detailed exemplary computing device suitable for use in conjunction with various aspects of the invention.

FIG. 2b illustrates a somewhat more detailed example of a suitable computing device from FIG. 2a and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2b, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 1A:
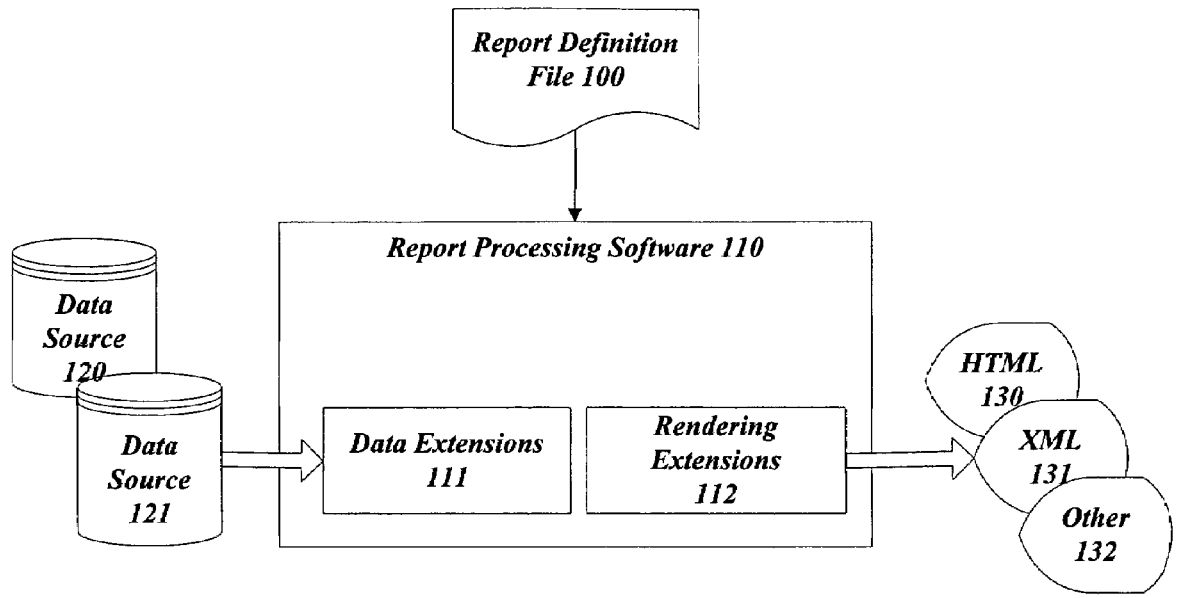
FIG. 1a illustrates a high level view of exemplary report processing software suitable for use with the systems and methods of the invention.
Figure 1B:
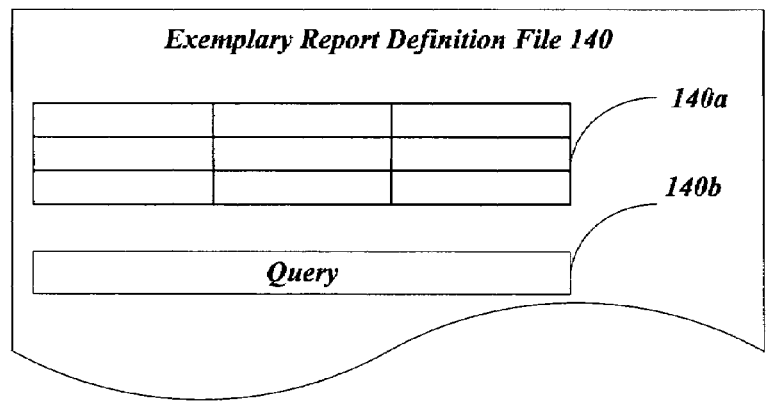
FIG. 1b illustrates a more detailed view of a report definition file comprising a report layout and a query.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2C:
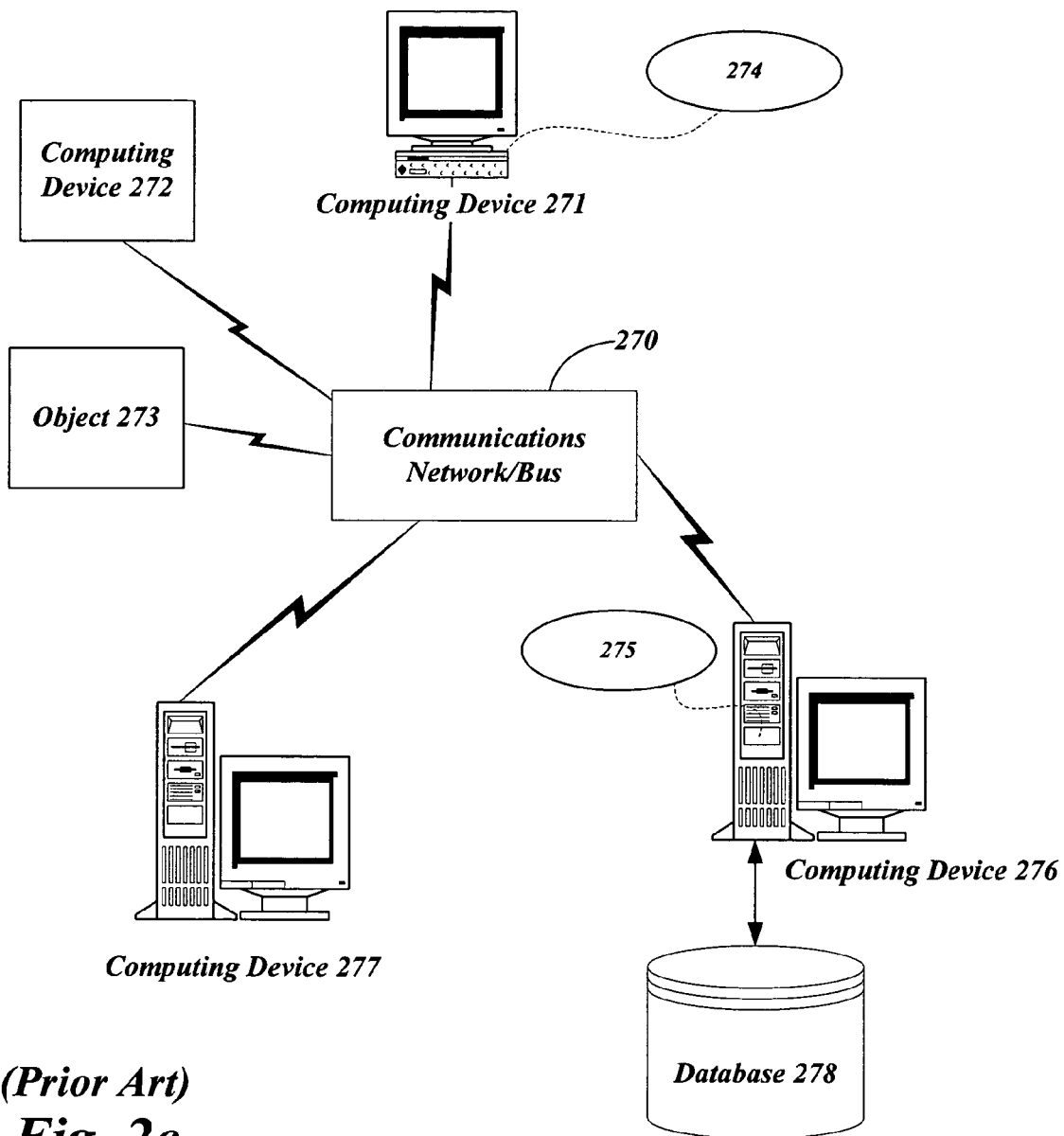
FIG. 2c illustrates an exemplary networked computing environment in which many computerized processes, including those of the invention, may be implemented.
Figure 3:
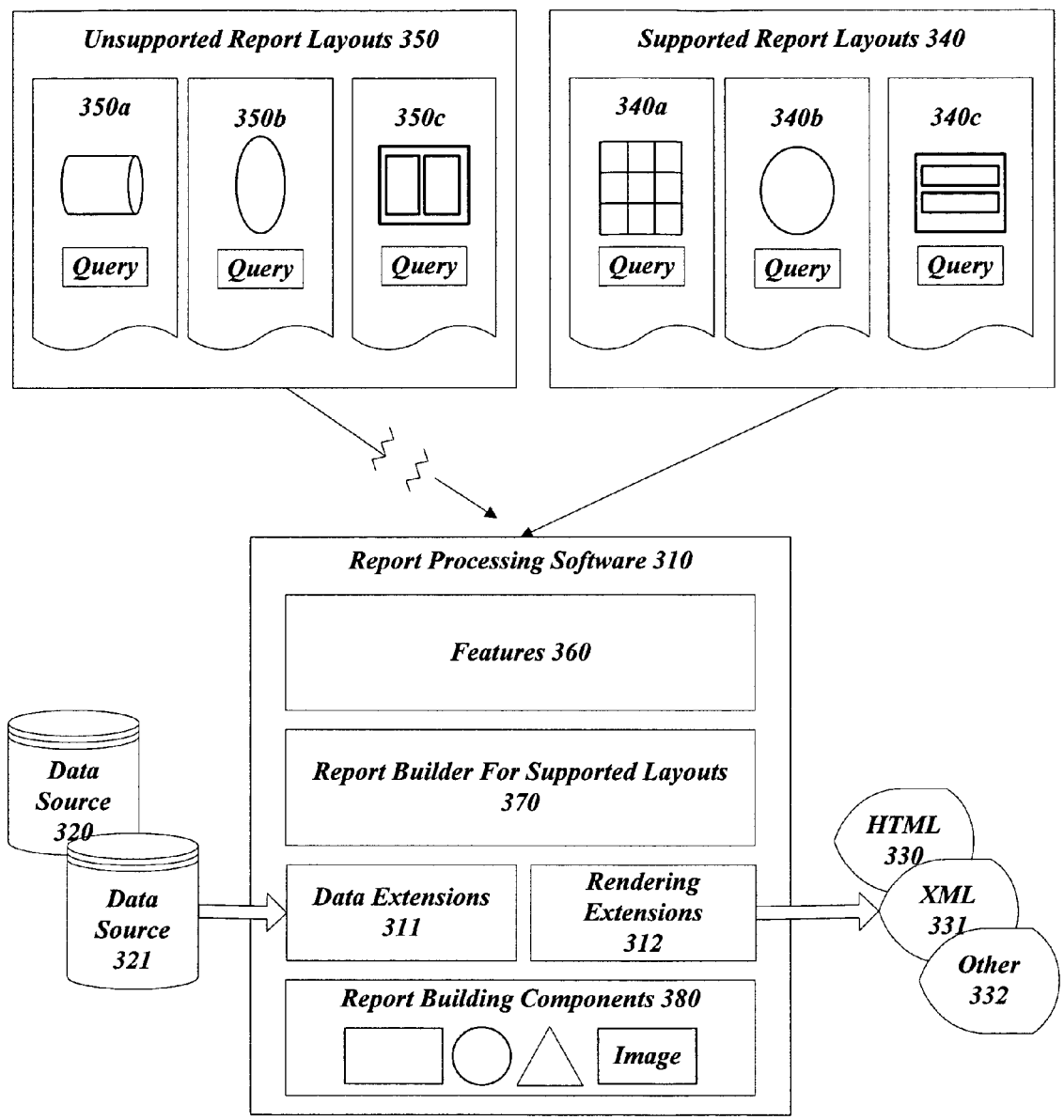
FIG. 3 illustrates a view of prior art report processing software that is incapable of supporting custom layouts.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A computer readable storage medium bearing instructions for generating a report, comprising:
   instructions for generating at least one report according to a custom layout, said instructions comprising:
      instructions for reading a report definition file, wherein the report definition file defines a graphical representation of a report;
      instructions for providing a plurality of software objects, each of the plurality of software objects for generating a plurality of graphical features for reports, each of the plurality of software objects being a discrete unit of software implemented using object oriented techniques;
      instructions for providing an interface that allows an external third party software process to access the plurality of objects;
      instruction for receiving via the interface a request from the external third party software process to operate a first of the plurality of objects on the report definition file to revise the graphical representation of a report and in response to the request from the external third party software process creating an instance of the first of the plurality of objects to handle the request;
      instructions for receiving via the interface a request from the external third party software process to operate a second of the plurality of objects on the report definition file to revise the graphical representation of a report and in response to the request from the external third party software process creating an instance of the second of the plurality of objects to handle the request; and
      instructions for performing initial processing on said report definition file, wherein initial processing occurs prior to processing by said external third party process, and wherein said initial processing enforces a set of criteria for the report definition file.

2. The computer readable storage medium of claim 1, wherein said the report definition file bears a first identification, and wherein said third party automated process bears a second identification, and wherein an appropriate third party automated process can be selected for use with the report definition file based on said first and second identifications.

3. The computer readable storage medium of claim 1, wherein said interface is published to allow all users of said computer readable medium to create said third party automated process.

4. The computer readable storage medium of claim 1, further comprising instructions for providing a design tool to assist in creating the report definition file.

5. The computer readable storage medium of claim 4, further comprising instructions for providing a second interface that allows a second external third party automated process to access functions represented by said instructions for providing a design tool.

6. The computer readable storage medium of claim 1, further comprising instructions for determining a second external process to build said graphical representation if said third party process is not available.

7. The computer readable storage medium of claim 1, further comprising instructions for receiving a set of column groups for the graphical representation, and instructions for placing data in said column groups.

8. The computer readable storage medium of claim 1, further comprising instructions for receiving a set of cell identifiers for cells in the graphical representation, and instructions for placing data in said cells.

9. The computer readable storage medium of claim 1, wherein the report definition file is an extensible markup language (XML) file.

10. The computer readable storage medium of claim 1, wherein the instructions for generating a plurality of graphical features for reports are referenced in an index.

11. A method, implemented in a computing system, for generating a report, comprising:
   generating at least one report according to a custom layout, said generating comprising:
      reading a report definition file, wherein the report definition file defines a graphical representation of a report;
      providing a plurality of software objects, each of the plurality of software objects for generating graphical features for reports, each of the plurality of software objects being a discrete unit of software implemented using object oriented techniques;
      providing an interface that allows an external third party software process to access the plurality of objects;
      receiving via the interface a request from the external third party software process to operate a first of the plurality of objects on the report definition file to revise the graphical representation of a report and in response to the request from the external third party software process creating an instance of the first of the plurality of objects to handle the request; and
      receiving via the interface a request from the external third party software process to operate a second of the plurality of objects on the report definition file to revise the graphical representation of a report and in response to the request from the external third party software process creating an instance of the second of the plurality of objects to handle the request.

12. The method of claim 11, wherein the report definition file bears a first identification, and wherein said third party process bears a second identification, and wherein an appropriate third party process can be selected for use with the report definition file based on said first and second identifications.

13. The method of claim 11, wherein said interface is published.

14. The method of claim 11, further comprising performing initial processing on said report definition file, wherein initial processing occurs prior to processing by said third party process, and wherein said initial processing enforces a set of criteria for the report definition file.

15. The method of claim 14, further comprising providing a design tool to assist in creating the report definition file.

16. The method of claim 15, further comprising providing a second interface that allows a second third party process to access functions of said design tool.

17. The method of claim 11, further comprising determining a second process to build said graphical representation if said third party automated process is not available.

18. The method of claim 11, further comprising receiving a set of column groups for the graphical representation, and placing data in said column groups.

19. The method of claim 11, further comprising receiving a set of cell identifiers for cells in the graphical representation, and placing data in said cells.

20. The method of claim 11, wherein the report definition file is an extensible markup language (XML) file.

21. The method of claim 11, wherein the processes for generating a plurality of graphical features for reports are referenced in an index.

* * * * *